No. 773,735. PATENTED NOV. 1, 1904.
T. H. GRIFFITTS.
POWER HAMMER.
APPLICATION FILED SEPT. 26, 1903.
NO MODEL.
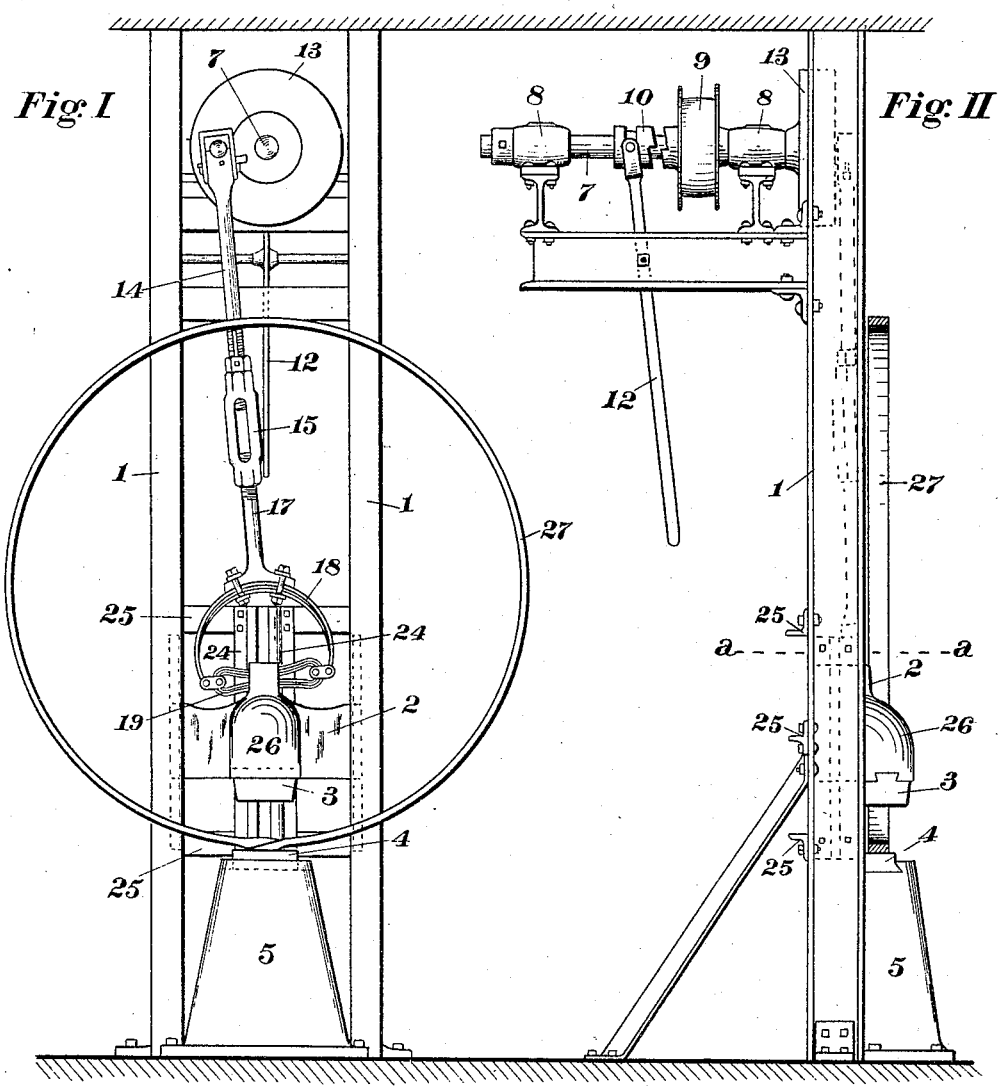
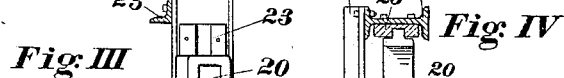
WITNESSES: INVENTOR:
P. W. J. Lander, Thomas H. Griffitts,
George S. Manuel By J. Richards & Co.
Atty.

No. 773,735.

Patented November 1, 1904.

UNITED STATES PATENT OFFICE.

THOMAS H. GRIFFITTS, OF SAN FRANCISCO, CALIFORNIA.

POWER-HAMMER.

SPECIFICATION forming part of Letters Patent No. 773,735, dated November 1, 1904.

Application filed September 26, 1903. Serial No. 174,771. (No model.)

*To all whom it may concern:*

Be it known that I, THOMAS H. GRIFFITTS, a citizen of the United States, residing at San Francisco, county of San Francisco, and State of California, have invented certain new and useful Improvements in Power-Hammers; and I hereby declare the following to be a full, clear, and exact description of the same, reference being had to the accompanying drawings, forming a part of this specification.

This invention relates to certain improvements in machine-hammers, whereby they are especially adapted for welding vehicle-tires. My improvements consist in a hammer-head elastically impelled by power guided in the usual manner, but with its dies offset from the path of the hammer-head's movement to move in a plane in front of the main frame, while guided and supported by parallel guides on the latter, so that the tire to be welded can be vertically sustained in front of the hammer-head guides and still be in proper position to receive the blows of the welding operation.

The object of my invention is to facilitate and render more perfect the welding of vehicle-tires by power-driven apparatus; and to this end I employ devices as illustrated in the accompanying drawings, that form a part of this specification, having notation as follows:

Figure I is a front elevation of a power-driven hammer constructed according to my invention; Fig. II, a side view of Fig. I; Fig. III, a side view of the hammer-head detached and a partial view of connected parts. Fig. IV is a transverse section on the line *a a* in Fig. II.

In welding vehicle-tires the work cannot be done by a common power-hammer, because the plane of the tire is obstructed above and below the hammer-head and anvil. A special hammer for this purpose would be expensive, because of infrequent use in ordinary shops; but with my improvement a power-hammer can be applied to general purposes when not required for welding tires.

The construction and manner of operating is illustrated by the drawings, 1 being the usual vertical frame, 2 the hammer-head, 3 the top or moving die, 4 the fixed die, and 5 the anvil. The crank-shaft 7 is mounted in bearings 8 and is preferably driven by a band-pulley 9, loose on the shaft 7 and engaged thereto by a common clutch 10, operated by a lever 12 or other suitable devices. The different members of the frame 1 are composed of rolled bars, known as I-beam sections or other suitable form, preferably of steel, and joined as shown in the drawings. This permits a strong construction at a moderate weight and expense and affords a desirable support and guidance at four points for a tire held vertically against the main frame in position to be welded by the agency of the projecting dies 3 and 4. On the forward end of the shaft 7 is a crank-wheel 13 and a connection extending therefrom to the hammer-head 2, as shown in Fig. I. This connection is composed of several parts, as follows: A top section 14, a turnbuckle 15 to adjust the length, a bottom section 17, a curved deflecting spring 18, attached at each side to a multifolded strap 19, that passes through a mortise 20 in the hammer-head 2. This constitutes an elastic connection that enables a rapid reciprocal motion of the hammer-head 2 and the die 3. This latter has ledges 22 on its sides that slide in fixed ways 23, attached to the posts 1, also is supported at the back by a guide 24, attached to the cross-bars 25, also bolted to the guide-posts 1, as shown in Fig. III.

The hammer-head 2 is formed with an overhanging mass 26 at the front, as seen in Fig. II, the die 4 being in advance of the posts 1, so the tire 27 when being operated upon is in front of and clear of these posts and other operating parts. The anvil 5 is set accordingly.

The lever 12 can be operated by a treadle, if required, when the hammer is to act at a constant speed, or if a variable rate is required, as in general work, the pulley 9 is fixed on the shaft 7, and a driving-band is arranged with an adjustable tension-pulley to give, by slipping on the pulley 9, any required speed or number of blows.

Having thus explained the nature and objects of my invention, what I claim as new, and desire to secure by Letters Patent, is—

In a power-hammer, a main frame having vertical guide members whose front faces stand all in one vertical plane, a movable hammer-head sliding between said guide members, having a portion projecting beyond the front plane of said guide members, means for reciprocating the hammer located wholly in the rear of the front faces of the guide members, an anvil-block beneath said hammer-head projecting beyond the front plane of said guide members, and plane-faced welding-dies on said hammer-head and anvil-block respectively, projecting beyond the front plane of said guide members, whereby a tire vertically placed for welding between said welding-dies may be supported against the plane face of the guide members, and bear against the same at four different points, substantially as specified.

In testimony whereof I have signed my name to this specification in the presence of two subscribing witnesses.

THOMAS H. GRIFFITTS.

Witnesses:
P. W. J. LANDER,
ALFRED A. ENQUIST.